(12) United States Patent
Bertolli et al.

(10) Patent No.: US 9,772,824 B2
(45) Date of Patent: *Sep. 26, 2017

(54) PROGRAM STRUCTURE-BASED BLOCKING

(71) Applicant: International Business Machines Corporation, Armonk, NY (US)

(72) Inventors: Carlo Bertolli, Dobbs Ferry, NY (US); Alexandre E. Eichenberger, Chappaqua, NY (US); John K. O'Brien, South Salem, NY (US); Zehra N. Sura, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 15 days.

This patent is subject to a terminal disclaimer.

(21) Appl. No.: 14/668,108

(22) Filed: Mar. 25, 2015

(65) Prior Publication Data

US 2016/0283210 A1    Sep. 29, 2016

(51) Int. Cl.
G06F 9/45      (2006.01)
G06F 12/0875   (2016.01)
G06F 9/30      (2006.01)

(52) U.S. Cl.
CPC .............. *G06F 8/41* (2013.01); *G06F 8/443* (2013.01); *G06F 9/30* (2013.01); *G06F 12/0875* (2013.01); *G06F 2212/452* (2013.01)

(58) Field of Classification Search
CPC .. G06F 12/0875; G06F 2212/452; G06F 8/41; G06F 8/443; G06F 9/30
See application file for complete search history.

(56) References Cited

U.S. PATENT DOCUMENTS 5,568,624 A * 10/1996 Sites .................. G06F 9/30
                                                  712/223
5,701,435 A * 12/1997 Chi .................... G06F 9/3808
                                                  711/125
6,055,621 A *  4/2000 Puzak .................. G06F 9/3802
                                                  712/207

(Continued)

FOREIGN PATENT DOCUMENTS

EP          0496439 B1       1/1998

OTHER PUBLICATIONS

Todd C. Mowry et al., "Design and Evaluation of a Compiler Algorithm for Prefetching", [Online], ACM 1992, pp. 1-12, [Retrieved fromInternet on Apr. 29, 2016], <http://camlunity.ru/swap/Library/Conflux/Techniques%20-%20Prefetching/mowry92_prefetching.pdf>.*

Alexander C. Klaiber et al. "An Architecture Abstract for Software-Controlled Data Prefet thing", [Online], 1991, pp. 43-53, [Retrieved from Internet on Oct. 23, 2016], <https://pdfs.semanticscholar.org/03b9/befc168609ef1cafc85fdc3b4d5bc335d0b9.pdf>.*

(Continued)

*Primary Examiner* — Ziaul A Chowdhury
(74) *Attorney, Agent, or Firm* — Cantor Colburn LLP

(57) ABSTRACT

Embodiments relate to program structure-based blocking. An aspect includes receiving source code corresponding to a computer program by a compiler of a computer system. Another aspect includes determining a prefetching section in the source code by a marking module of the compiler. Yet another aspect includes performing, by a blocking module of the compiler, blocking of instructions located in the prefetching section into instruction blocks, such that the instruction blocks of the prefetching section only contain instructions that are located in the prefetching section.

8 Claims, 7 Drawing Sheets

(56) References Cited

U.S. PATENT DOCUMENTS

| | | | | |
|---|---|---|---|---|
| 6,167,509 | A * | 12/2000 | Sites | G06F 9/30 712/205 |
| 6,959,379 | B1 * | 10/2005 | Wojcieszak | G06F 9/30149 712/241 |
| 7,286,548 | B1 * | 10/2007 | Jair | H04L 49/901 370/412 |
| 7,669,194 | B2 | 2/2010 | Archambault et al. | |
| 8,413,127 | B2 | 4/2013 | Archambault et al. | |
| 9,092,236 | B1 * | 7/2015 | Jung | G06F 8/443 |
| 2002/0029357 | A1 * | 3/2002 | Charnell | G06F 8/4442 714/5.11 |
| 2003/0088864 | A1 * | 5/2003 | Tirumalai | G06F 8/4442 717/160 |
| 2003/0154349 | A1 * | 8/2003 | Berg | G06F 9/342 711/137 |
| 2004/0181655 | A1 * | 9/2004 | Azuma | G06F 9/30047 712/241 |
| 2004/0261055 | A1 * | 12/2004 | Bertelrud | G06F 8/41 717/106 |
| 2006/0248520 | A1 * | 11/2006 | Kawabata | G06F 8/443 717/160 |
| 2009/0254895 | A1 * | 10/2009 | Chen | G06F 8/4442 717/161 |
| 2011/0276781 | A1 | 11/2011 | Sengupta et al. | |
| 2013/0339665 | A1 * | 12/2013 | Alexander | G06F 9/3804 712/207 |
| 2014/0033217 | A1 * | 1/2014 | Vajda | G06F 9/528 718/102 |
| 2015/0006867 | A1 * | 1/2015 | Gschwind | G06F 9/30145 712/229 |
| 2015/0324183 | A1 * | 11/2015 | Fisher | G06F 8/41 717/176 |
| 2016/0085528 | A1 * | 3/2016 | Kalogeropulos | G06F 8/443 717/153 |

OTHER PUBLICATIONS

John Carter et al. Impulse: Building a Smarter Memory Controller, [Online], Jan. 1999, pp. 1-10, [Retrieved from Internet on Jan. 23, 2017], <http://ieeexplore.ieee.org/stamp/stamp.jsp?arnumber=744334>.*

M. J. Charney et al. "Prefetching and memory system behavior of the SPEC95 benchmark suite", [Online], 1997, pp. 265-286, [Retrieved from Internet on Jan. 23, 2017], <http://ieeexplore.ieee.org/stamp/stamp.jsp?arnumber=5389382>.*

Trishul M. Chilimbi et al., "Making Pointer-Based Data Structures Cache Conscious", [Online], 2000, pp. 67-74, [Retrieved from Internet on Jan. 23, 2017], <http://ieeexplore.ieee.org/stamp/stamp.jsp?arnumber=889095>.*

Jacob Leverich et al., "Comparing Memory Systems for Chip Multiprocessors", [Online], 2007, pp. 358-368, [Retrieved from Interent on Jan. 23, 2017], <http://delivery.acm.org/10.1145/1260000/1250707/p358-leverich.pdf>.*

IP.com: "A Novel Data Pre-Fetch Method Under Heterogeneous Architecture," Authors et al.: Disclosed Anonymously; IP.com No. IPCOM000224167D; Dec. 12, 2012; pp. 1-14.

SPI DST, et al., "Sequential Program Prefetching in Memory Hierarchies," IP.com; Original Disclosure Information: IEEE Computer vol. 11; No. 12; pp. 7-9; Original Publication Date: Dec. 1, 1978; IP.com No. IPCOM000131354D; pp. 1-21. Nov. 10, 2005.

SPI DST, et al., "Using Program Structure to Achieve Prefetching for Cache Memories," Original Publication Date: Jan. 31, 1987; IP.com No. IPCOM000151517D; IP.com Electronic Publication: Apr. 22, 2007; pp. 1-180.

Carlo Bertolli et al., "Program Structure-Based Blocking", U.S. Appl. No. 14/741,995, filed Jun. 17, 2015.

List of IBM Patents or Patent Applications Treated as Related; (Appendix P), Filed Jul. 28, 2016; 2 pages.

* cited by examiner

```
#pragma omp target data map (to: ...<vars>),
  map (tofrom: <var>) {
#pragma omp target {
// time step loop
while (!convergence) {
#pragma omp parallel for      ← 501
for all vertices in mesh
  F (..);
#pragma omp parallel for      ← 502
for all edges in mesh
  G (..);
...
#pragma omp parallel for      ← 503
for all vertices in mesh
  H (..);
```

PROGRAM STRUCTURE-BASED BLOCKING

STATEMENT REGARDING FEDERALLY SPONSORED RESEARCH OR DEVELOPMENT

This invention was made with government support under B599858 awarded by the Department of Energy. The government has certain rights in the invention.

BACKGROUND

The present invention relates generally to computer systems, and more specifically, to program structure-based blocking in a computer system.

Prefetching of instructions may be implemented in software and/or hardware during execution of software by a processor. In software, the runtime environment may prefetch instructions into an instruction cache of the processor during execution. The runtime environment keeps track of dynamic dependences between instructions in the software in order to determine what prefetching instructions need to be issued. Prefetching instructions may also be issued by hardware, such as a branch prediction module. However, support for prefetching in the runtime environment may be relatively expensive in terms of processor resources, and use of specialized hardware for prefetching may increase the area and power consumption of the processor.

SUMMARY

Embodiments include a method, system, and computer program product for program structure-based blocking. An aspect includes receiving source code corresponding to a computer program by a compiler of a computer system. Another aspect includes determining a prefetching section in the source code by a marking module of the compiler. Yet another aspect includes performing blocking of instructions located in the prefetching section into instruction blocks by a blocking module of the compiler, such that the instruction blocks of the prefetching section only contain instructions that are located in the prefetching section, by a blocking module of the compiler. Yet another aspect includes performing, by a blocking module of the compiler, blocking of instructions located in the prefetching section into instruction blocks, such that the instruction blocks of the prefetching section only contain instructions that are located in the prefetching section.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIG. 5 illustrates an example of prefetching sections in source code.

DETAILED DESCRIPTION

Figure 1:
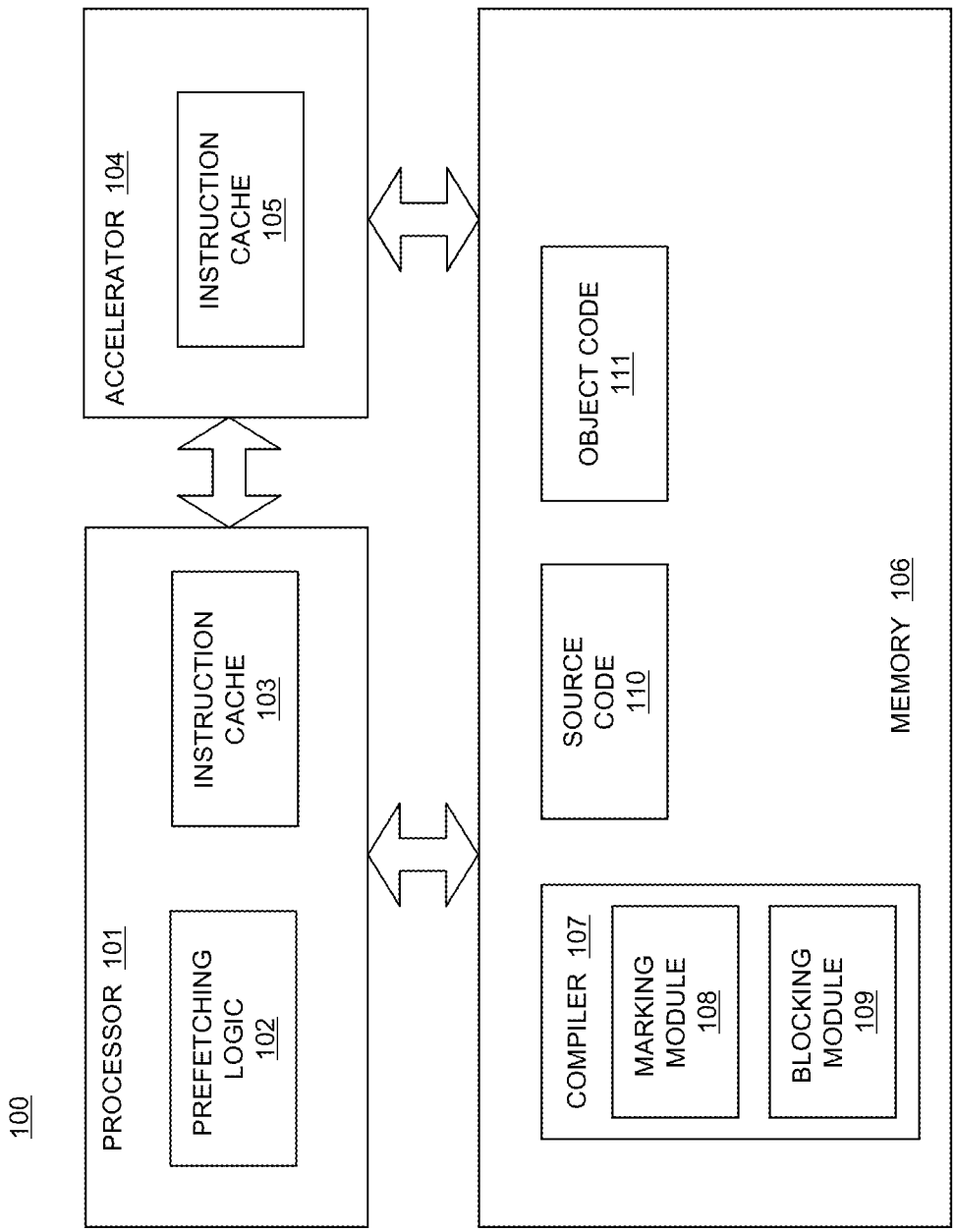
FIG. 1 depicts an embodiment of a computer system for program structure-based blocking in accordance with an embodiment.

Embodiments of program structure-based blocking are provided, with exemplary embodiments being discussed below in detail. The compiler performs additional passes through the code to determine particular sections of program code that are appropriate for prefetching during execution of the software, and then performs blocking of the instructions in the software, and inserts prefetching instructions into the compiled program code, based on the determined prefetching sections. Therefore, during runtime of the compiled code, prefetching of instructions is performed without requiring the runtime environment or specialized hardware to issue prefetching instructions. Program code that is compiled using program-structure based blocking may be used to implement prefetching on an accelerator, which may not have a branch prediction unit.

In order to determine the prefetching sections, the compiler may identify sequences of instructions in the program code that have relatively high instruction cache locality. Analysis of the source code is performed by the compiler to determine particular sequences of instructions that will be reexecuted a relatively large number of times (e.g., by many orders of magnitude) as compared to other sequences of instructions in the program code. Any appropriate method of program analysis may be used to identify prefetching sections in various embodiments, for example, loop structures in the program code may be identified and analyzed. When a prefetching section is identified by the compiler, the compiler marks the identified section with start and end labels. Then, in a subsequent pass through the program code, the compiler groups the instructions of the program code into instruction blocks (i.e., groups comprising a relatively small number of instructions, for example, 10) based on the start and end labels. Instructions located inside of a prefetching section are blocked together first, such that the instruction blocks of a particular prefetching section do not contain instructions that are not part of that prefetching section. Instructions that are not part of any prefetching section are then blocked together sequentially. At runtime, upon touching one of the blocks of a prefetching section, all of the blocks of the prefetching section are loaded into the instruction cache at the same time. Blocking may further be performed based on instruction cache size. When a group of blocks corresponding to a prefetching section is too large to fit into an instruction cache together, the block group may be further subdivided into smaller sub-groups until each sub-group can fit in the instruction cache.

When performing the blocking of a marked prefetching section, the compiler may check to see if the instructions in the prefetching section have a size that is smaller than the available instruction cache. If the prefetching section is larger than the instruction cache, the prefetching section is broken into smaller prefetching sections, such that each individual entire prefetching section can fit into the instruction cache. Then, the instructions of each prefetching section are blocked sequentially, such that no instructions that are not part of the prefetching section are included in the blocks of the prefetching section. The derived blocks are linked together using metadata. Any remaining instructions in the software that are not part of any prefetching sections can be freely blocked. At run-time, upon entering the first block in a prefetching section, all blocks in the same prefetching section are loaded into the instruction cache.

Turning now to FIG. 1, an embodiment of a computer system 100 for program structure-based blocking is generally shown. Computer system 100 includes a processor, 101, an accelerator 104, and a memory 106 that are in communication with each other. Processor 101 includes prefetching logic 102 and instruction cache 103. Accelerator 104 includes an instruction cache 105, but does not include any prefetching logic. Compiler 107 is stored in memory 106. Compiler 107 receives source code, such as source code 110, and compiles the source code into object code 111, which comprises executable computer code. Object code 111 may be run on any appropriate computer, for example, a computer that does not contain a compiler such as compiler 107, or source code 110. Compiler 107 includes a marking module 108, which makes a first pass through the source code 110 during compilation, and blocking module 109, which makes a second pass through source code 110 after the first pass has been completed. In the first pass, marking module 108 analyzes the program structure of source code 110, and determines and marks prefetching sections in the source code 110. In the second pass, blocking module 109 blocks the instructions in source code 110 based on the marks that were inserted by marking module 108 and inserts prefetching instructions. Therefore, object code 111 contains instruction blocks and prefetching instructions that correspond to prefetching sections that were determined based on the structure of source code 110. FIG. 1 is shown for illustrative purposes only, a system that implements program structure-based blocking may have any appropriate configuration. Further, object code 111 that is generated by compiler 107 may be executed on any appropriate computer system; for example, object code 111 may be executed on a computer system that does not contain the source code 110 or the compiler 107. In various embodiments, source code 110 may be in any appropriate high-level programming language, such as Java or C, and object code 111 may be in a low-level machine language such as assembly language.

Figure 2:
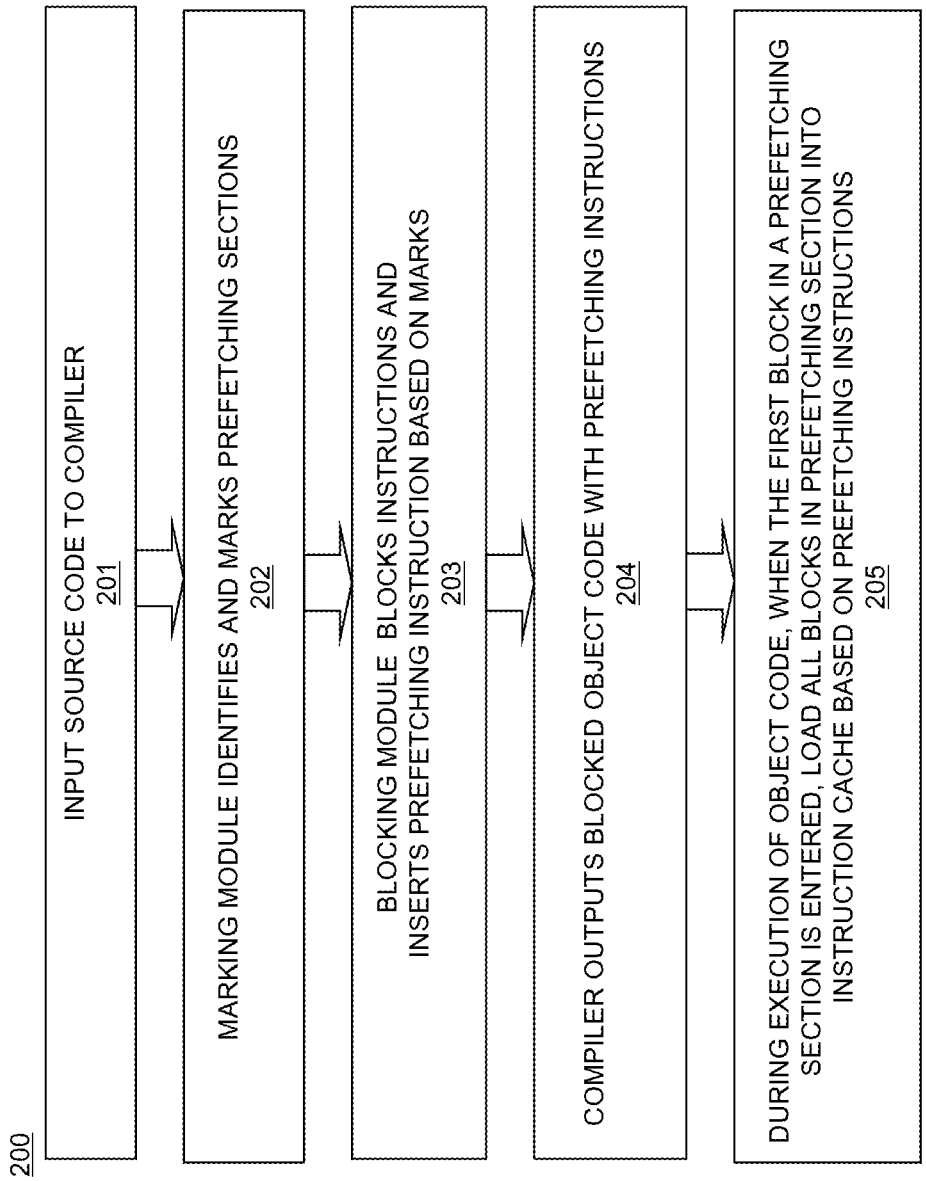
FIG. 2 depicts a process flow for program structure-based blocking in accordance with an embodiment.

FIG. 2 illustrates an embodiment of a method 200 for program structure-based blocking. FIG. 2 is discussed with respect to FIG. 1. First, in block 201, source code, such as source code 110, is input into a compiler 107. Next, in block 202, the marking module 108 makes a first pass through the source code 110, in which the marking module 108 analyzes the program structure of source code 110 in order to identify and mark prefetching sections. The marking module 108 is discussed in further detail below with respect to FIG. 3. Then, in block 203, the blocking module 109 makes a second pass through the code that is being compiled by compiler 107, in which the blocking module 109 divides the instructions in the code that is being compiled into blocks based on the marks that were inserted by marking module 108, and also inserts prefetching instructions into the code based on the marks. The blocking module 109 is discussed in further detail below with respect to FIG. 4. In block 204, the compiler 107 outputs object code 111, which contains the blocking and prefetching instructions that were determined in block 203. In block 205, the object code 111 is executed. During execution of object code 111, prefetching is performed based on the prefetching instructions, such that blocks located in prefetching sections that were determined by marking module 108 are fetched into an instruction cache, such as instruction cache 105 in accelerator 104, all together.

Figure 3:
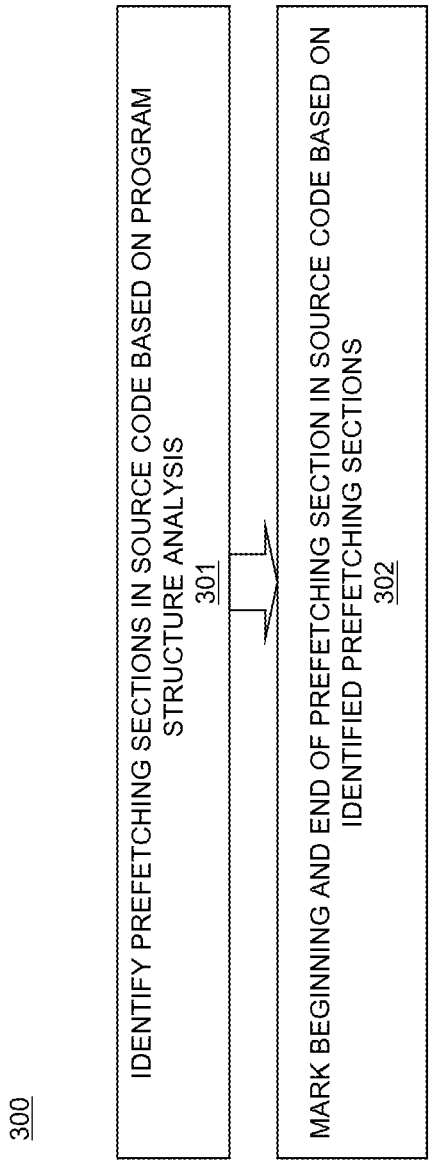
FIG. 3 depicts a process flow for marking prefetching sections in a compiler in accordance with an embodiment.

FIG. 3 illustrates an embodiment of a method 300 for marking prefetching sections in a compiler, as is performed in block 202 of FIG. 2. Method 300 may be implemented in marking module 108 of FIG. 1. First, in block 301, one or more prefetching sections of the source code 110 are identified based on analysis of the program structure of source code 110 by marking module 108. This may be performed by identifying control-flow locality forms in the source code 110. Then, in block 302, the marking module 108 inserts marks indicating the beginning and end of any prefetching section that was identified in block 301.

In an example of program analysis that may be used by the marking module 108 to identify prefetching sections in block 301, the source code 110 may have a structure that is based on meshes or graphs that are used to model physical space and solve differential equations, such as is performed in some scientific simulations. In such a simulation, the majority of execution time is spent executing instruction loops that sweep the mesh (e.g. iterate over all edges or vertices). The instructions included in mesh sweeping loops form a clear instruction sequence that may be marked by the compiler as a prefetching section. Other program analysis techniques for different program complexities (e.g. programs with a large amount of conditionals and nested loop), may be implemented in the compiler by analyzing loop trip counts and placement of if-statements. Innermost loops may be considered first as pre-fetching sections; for example, loop trip counts of an innermost loop compared to an outer loop may be determined in order to mark the pre-fetching sections. The number of statements inside a loop may indicate if a loop body may be marked as a single prefetching section (i.e., whether the loop includes too many instructions, and therefore is too large to mark as a single prefetching section). Analysis of conditional statements inside loops may also be performed to determine recurrent paths in the software. Any appropriate type of program analysis may be used by marking module 108 to determine sections of the source code 110 that will be frequently re-executed, and therefore require prefetching.

Figure 4:
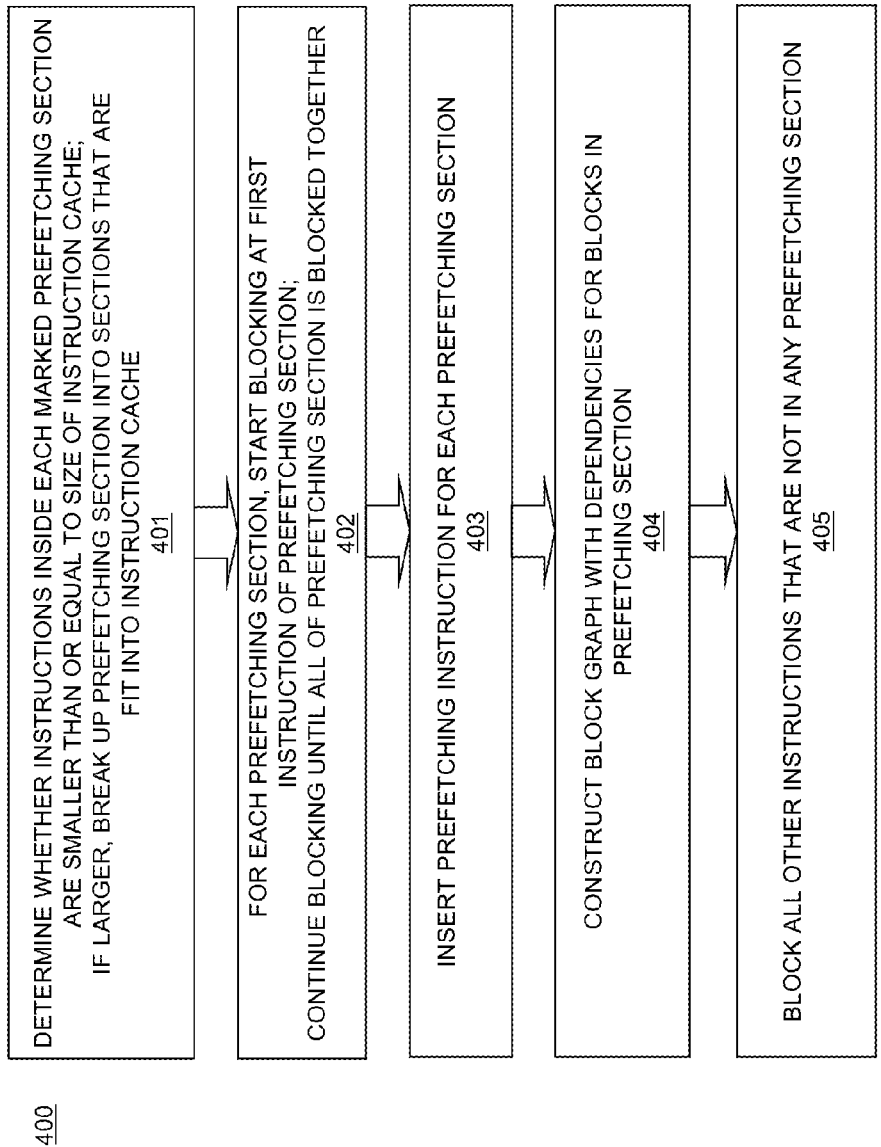
FIG. 4 depicts a process flow for blocking marked prefetching sections in a compiler in accordance with an embodiment.

FIG. 4 illustrates an embodiment of a method 400 for blocking the marked prefetching sections in a compiler, as is performed in block 203 of FIG. 2. Method 400 may be implemented in blocking module 109 of FIG. 1. First, in block 401, it is determined whether the set of instructions within a marked prefetching section have a size that is larger than an instruction cache, such as instruction cache 105. If it is determined in block 401 that the instructions included in a marked prefetching section have a size that is larger than the instruction cache, the section are split into smaller prefetching sections by blocking module 109 until the size of each prefetching section is smaller than or equal to the size of the instruction cache, such that the entirety of each individual prefetching section can fit in an instruction cache such as instruction cache 105. Then, in block 402, the instructions within the prefetching section are blocked together. Blocking starts at the beginning of the prefetching section, and continues until all instructions in the prefetching section are blocked. Then, in block 403, a prefetching instruction is inserted for the prefetching section. In block 404, a block graph is constructed for the prefetching section, in order to link the one or more blocks of the prefetching section together. Blocks 401, 402, 403, and 404 are repeated by blocking module 109 for each prefetching section in the source code 110 that was marked by marking module 108. Then, in block 405, any instructions in source code 110 that are not located inside of any prefetching section are blocked.

FIG. 5 illustrates an example of prefetching sections in source code 500 that may be determined by a marking module 108 according to method 300 of FIG. 3. Source code 500 includes a while loop, in addition to 3 for loops 501, 502, and 503 that are nested in the while loop. In the example of FIG. 5, it is determined by marking module 108 that, during execution of the source code 500, about 20% of the execution time will be spent in for loop 501; about 50% of the execution time will be spent in for loop 502, and about 20% of the execution time will be spent in for loop 503. The remaining 10% of the execution time for source code 500 will be spent in the remaining code that is not located in any of for loops 501-503. Therefore, each of for loops 501-503 is marked as a separate prefetching section by marking module 108, by inserting start and end marks for each of loops 501-503.

Figure 6:
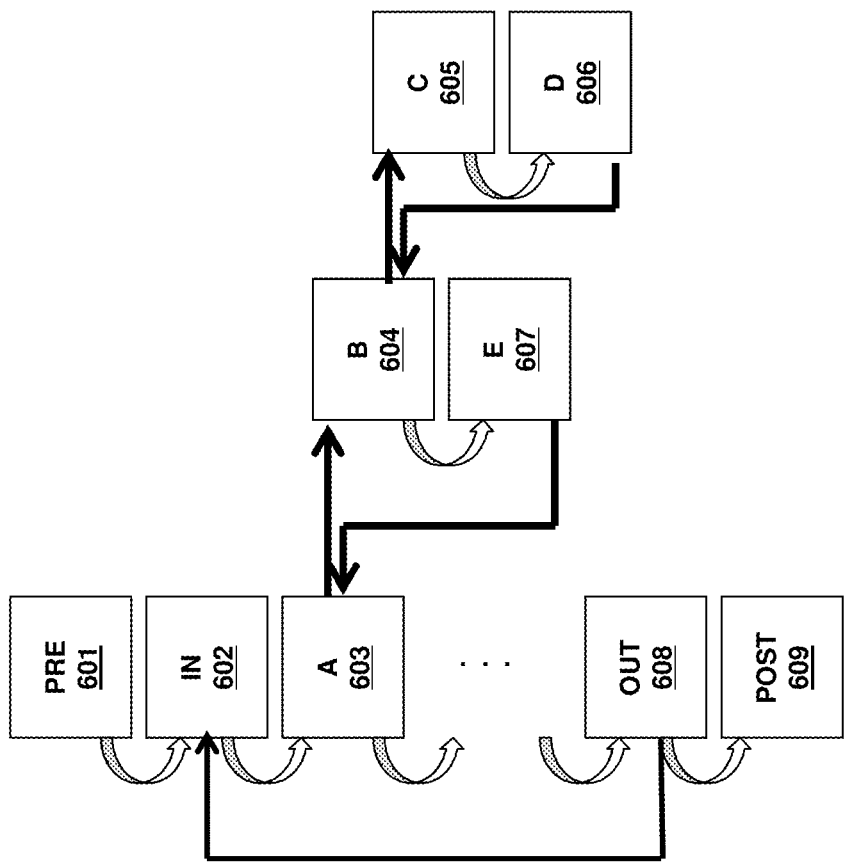
FIG. 6 illustrates an example of a blocked prefetching section.

FIG. 6 illustrates an example of a blocked code 600. Blocked code comprises instructions blocks 601-609. Each instruction block 601-609 comprises a set number of instructions, for example, 10. In blocked code 600, blocks 602-608 make up a loop that has been identified as a prefetching section; the loop may correspond to, for example, one of for loops 501-503 of FIG. 5. Block 601 comprises instructions that are located before the prefetching section that comprises blocks 602-608, and block 609 comprises instructions that are located after the prefetching section that comprises blocks 602-608. The blocks 602-608 that make up the prefetching section are all fetched into the instruction cache together when execution touches any of the blocks in the prefetching section. The blocks 602-608 only contain instructions that are part of the loop that was identified as the prefetching section, and do not contain any instructions that are not part of the prefetching section. At run time, all of blocks 602-608 are loaded into the instruction cache together.

Figure 7:
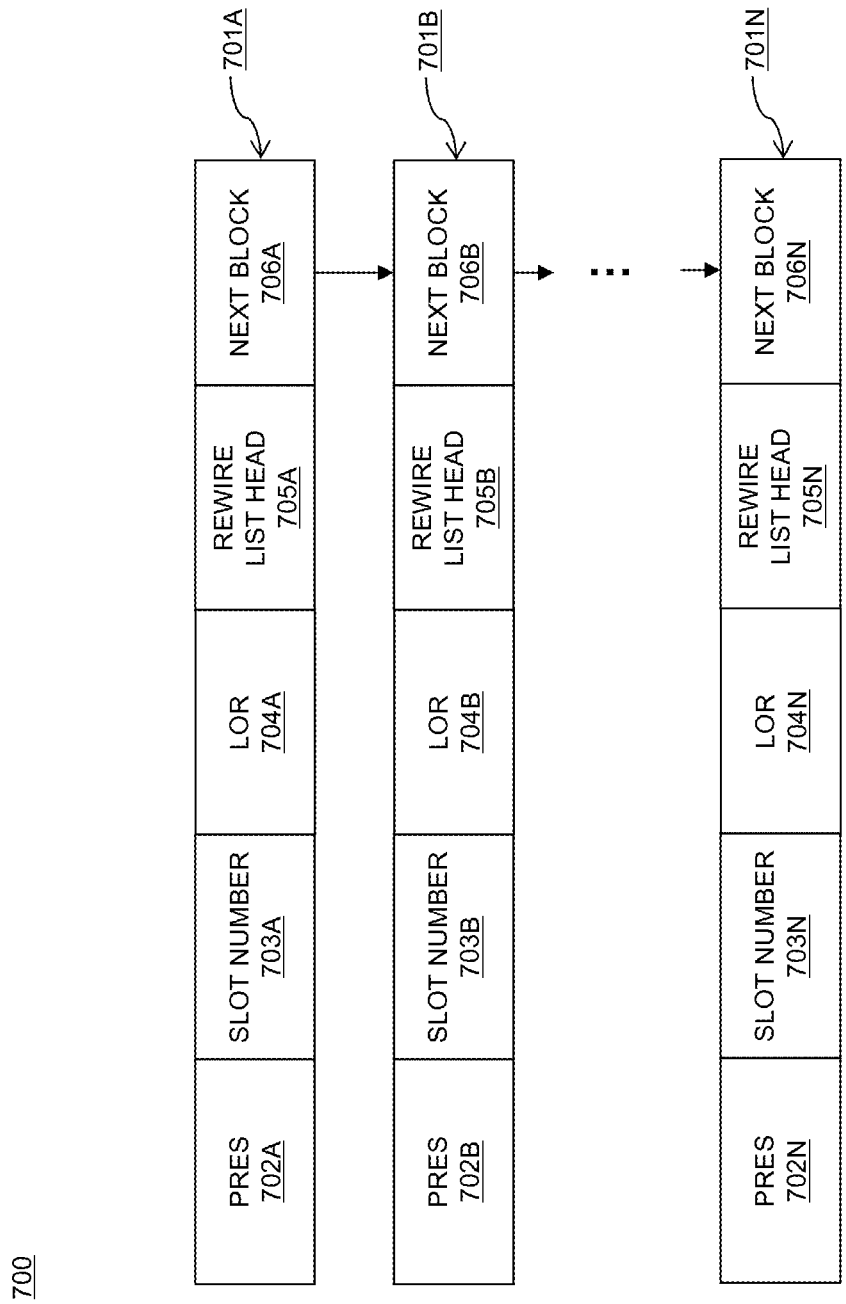
FIG. 7 illustrates an embodiment of linked block descriptors.

FIG. 7 illustrates an embodiment of linked block descriptors 700, such as are built in block 404 of FIG. 4. Each block in source code has a block descriptor such as block descriptors 701A-N. In the example of FIG. 7, each block descriptor 701A-N contains a plurality of fields that give information for the instruction block corresponding to the block descriptor. Presence bit 702A-N indicates at run-time whether the block corresponding to the entry is loaded into instruction cache. Slot number 703A-N identifies a position in the instruction cache where the block is or should be loaded; this field may be dynamically determined. The address in main memory of the block is stored in field 704A-N; this is used when copying the block from main memory into instruction cache. The pointer to the first/head element in a rewire list 705A-N gives a list of elements, where each element is a branch into the block described by the block descriptor 701A-N. Each branch in a block's rewire list 705A-N needs to be processed when the block is evicted from the instruction cache. Next block 706A-N contains a pointer to the next block in the prefetching section. Next block 706A-N may be empty for a block that is not part of any prefetching section. At runtime, the next block 706A-N information is used to load all the blocks of a prefetching section into the instruction cache. Each block only needs to know about its particular successors, as described by the block's next block field, in the prefetching section.

Technical effects and benefits include implementation of instruction prefetching with reduced software and hardware resources during runtime.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for implementing program structure-based blocking, the computer program product comprising:
a computer readable storage medium having program instructions embodied therewith, the program instructions readable by a processing circuit to cause the processing circuit to perform a method comprising:
receiving source code corresponding to a computer program by a compiler of a computer system;
analyzing the source code, by a marking module, to identify one or more prefetching sections of source code based on the one or more sections of source code that will be repeatedly executed a number of times, wherein the marking module comprises an extension of a compiler, and is executed during a compiling process by the compiler; and
grouping, by a blocking module, instructions located in the one or more prefetching sections into instruction blocks, such that the instruction blocks of the one or more prefetching sections only contain instructions that are located in the one or more prefetching sections respectively, wherein the blocking module comprises an extension of the compiler, and is executed during the compiling process by the compiler;
inserting, by the blocking module of the compiler, a set of prefetching instructions into each of the one or more prefetching sections; wherein:
the marking module inserts begin and end marks corresponding to each of the identified one or more prefetching sections into the computer program, and wherein the blocking module performs the grouping based on the inserted begin and end marks; and
executing the set of prefetching instructions causes all of the instruction blocks of the one or more prefetching sections to be loaded into an instruction cache during execution of the computer program.

2. The computer program product of claim 1, wherein the method comprises executing the computer program by an accelerator.

3. The computer program product of claim 1, further comprising grouping other instructions of the computer program after grouping of the instructions located in the one or more prefetching sections.

4. The computer program product of claim 1, further comprising constructing, by the blocking module of the compiler, block descriptors for the instruction blocks of the one or more prefetching sections that link the instruction blocks of the one or more prefetching sections together.

5. A computer system for program structure-based blocking, the system comprising:
a memory storing computer executable instructions including a blocking module and a marking module, wherein the blocking module and the marking module are extensions of a compiler, and executed during compiling process by the compiler; and
a processor, communicatively coupled to said memory, the computer system configured to perform a method comprising:
receiving source code corresponding to a computer program by a compiler of a computer system;
analyzing the source code, by the marking module of the compiler, to identify one or more sections of source code that will be repeatedly executed a number of times as one or more prefetching sections; and grouping, by a blocking module of the compiler, instructions located in the one or more prefetching sections into instruction blocks, such that the instruction blocks of the one or more prefetching sections only contain instructions that are located in the one or more prefetching sections respectively;

inserting, by the blocking module of the compiler, a set of prefetching instructions into each of the one or more prefetching sections; wherein:

the marking module inserts begin and end marks corresponding to each of the identified one or more prefetching sections into the computer program, and wherein the blocking module performs the grouping based on the inserted begin and end marks; and executing the set of prefetching instructions causes all of the instruction blocks of the one or more prefetching sections to be loaded into an instruction cache during execution of the computer program.

6. The computer system of claim 5, wherein the method comprises executing the computer program by an accelerator.

7. The computer system of claim 5, wherein the method further comprises grouping other instructions of the computer program after grouping of the instructions located in the one or more prefetching sections.

8. The computer system of claim 5, wherein the method further comprises constructing, by the blocking module of the compiler, block descriptors for the instruction blocks of the one or more prefetching sections that link the instruction blocks of the one or more prefetching sections together.

* * * * *